(12) United States Patent
Liu et al.

(10) Patent No.: US 11,458,638 B2
(45) Date of Patent: Oct. 4, 2022

(54) ROBOT MULTI-DEGREE-OF-FREEDOM CLAMPER

(71) Applicant: SHENYANG INSTITUTE OF AUTOMATION, CHINESE ACADEMY OF SCIENCES, Liaoning (CN)

(72) Inventors: Jinguo Liu, Liaoning (CN); Yunjun Liu, Liaoning (CN)

(73) Assignee: SHENYANG INSTITUTE OF AUTOMATION, CHINESE ACADEMY OF SCIENCES, Liaoning (CN)

( * ) Notice: Subject to any disclaimer, the term of this patent is extended or adjusted under 35 U.S.C. 154(b) by 69 days.

(21) Appl. No.: 16/957,720

(22) PCT Filed: Dec. 20, 2018

(86) PCT No.: PCT/CN2018/122219
§ 371 (c)(1),
(2) Date: Jun. 24, 2020

(87) PCT Pub. No.: WO2019/128821
PCT Pub. Date: Jul. 4, 2019

(65) Prior Publication Data
US 2021/0060796 A1  Mar. 4, 2021

(30) Foreign Application Priority Data

Dec. 25, 2017 (CN) .......................... 201711422333.3

(51) Int. Cl.
*B25J 15/00* (2006.01)
*B25J 15/08* (2006.01)
(Continued)

(52) U.S. Cl.
CPC ....... *B25J 15/0033* (2013.01); *B25J 15/0004* (2013.01); *B25J 15/0052* (2013.01);
(Continued)

(58) Field of Classification Search
CPC ................ B25J 15/0004; B25J 15/0033; B25J 15/0038; B25J 15/0042; B25J 15/0052; B25J 15/0253; B25J 15/086; B64G 1/646
(Continued)

(56) References Cited

U.S. PATENT DOCUMENTS 4,699,414 A * 10/1987 Jones ..................... B25J 15/026
294/119.1
5,598,628 A * 2/1997 Maejima ................ H01R 43/20
29/754
(Continued)

FOREIGN PATENT DOCUMENTS

CN  205009218 U  2/2016
CN  206588968 U  10/2017
(Continued)

*Primary Examiner* — Dean J Kramer
(74) *Attorney, Agent, or Firm* — Novick, Kim & Lee, PLLC; Allen Xue (57) ABSTRACT

A robot multi-degree-of-freedom clamper has a short stroke biaxial cylinder installed on the clamping jaw supporting frame and an output end connected with a pneumatic clamping jaw A. In addition, a clamping jaw finger A is connected with an output end of the pneumatic clamping jaw A. A long stroke biaxial cylinder is connected with a pneumatic clamping jaw B. A clamping jaw finger B is connected with the output end of the pneumatic clamping jaw B. A pneumatic clamping jaw C is positioned between the pneumatic clamping jaw A and the pneumatic clamping jaw B. A clamping jaw finger C is connected with the output end of the pneumatic clamping jaw C. The clamping jaw finger A and the pneumatic clamping jaw A are driven by the short stroke biaxial cylinder to move back and forth on the clamping jaw supporting frame.

10 Claims, 7 Drawing Sheets

(51) Int. Cl.
 *B25J 15/10* (2006.01)
 *B64G 1/64* (2006.01)
(52) U.S. Cl.
 CPC ............ *B25J 15/086* (2013.01); *B25J 15/103* (2013.01); *B64G 1/646* (2013.01)
(58) Field of Classification Search
 USPC ........................................................ 294/207
 See application file for complete search history.

(56) References Cited

U.S. PATENT DOCUMENTS

| | | | |
|---|---|---|---|
| 5,957,517 A | 9/1999 | Chen | |
| 6,158,113 A * | 12/2000 | Saito | B60R 16/0222 |
| | | | 140/149 |
| 8,408,616 B2 * | 4/2013 | Yeum | B25J 15/0052 |
| | | | 294/86.4 |
| 2014/0125080 A1 * | 5/2014 | Dan | B25J 15/0028 |
| | | | 294/213 |

FOREIGN PATENT DOCUMENTS

| | | |
|---|---|---|
| CN | 108000543 A | 5/2018 |
| CN | 207710805 U | 8/2018 |
| SU | 839987 A1 | 6/1981 |

* cited by examiner

ROBOT MULTI-DEGREE-OF-FREEDOM CLAMPER

TECHNICAL FIELD

The present invention relates to a clamper, particularly to a robot multi-degree-of-freedom clamper.

BACKGROUND

Propellant filling is an important link before rocket launching. The space powers in the world have been paying close attention to the research of automatic docking and disassembling technology of propellant filling pipeline joints. Docking and disassembling of pipeline joint connectors is a high risk link in filling, and is also a primary problem to be solved in realizing the automation of the filling process. In the work of adding and discharging the propellant of a launch vehicle, connection, disassembling and transportation of various propellant pipelines, and the cleaning work of propellant filling pipes and propellant storage tanks are extremely dangerous tasks, and can easily cause casualties. Therefore, research of an automatic filling robot technology is conducive to shortening preparation time before launching, decreasing workload and reducing risks of emergency produced by misoperation of service crew; improving the safety of rockets and operators; and enhancing the reliability and safety of the system, and has important significance to alleviating the labor intensity of the operators.

Meanwhile, at present, on the production line of the air-conditioning industry, the pressure-tightness test, vacuum pumping, coolant infusion, commercial inspection operation test and other procedures of the pipeline should be performed every day. The existing connection of a quick joint of the pipeline, a hydraulic valve and an air pressure valve is manual docking by staff, which consumes large manpower. Meanwhile, due to long manual operation time and low working efficiency, the time wasting phenomenon that a workpiece waits for people or people wait for the workpiece even appears.

SUMMARY

In view of the above problems, the purpose of the present invention is to provide a robot multi-degree-of-freedom clamper. The multi-degree-of-freedom clamper adopts humanoid configuration design, can realize automatic docking for a spring return type quick joint, and has unique appearance, novel structure, simple control and strong working reliability.

The purpose of the present invention is realized by the following technical solution:

The present invention comprises a clamping jaw finger A, a pneumatic clamping jaw A, a short stroke biaxial cylinder, a clamping jaw supporting frame, a bottom plate, a long stroke biaxial cylinder, a pneumatic clamping jaw B, a pneumatic clamping jaw C, a clamping jaw finger B and a clamping jaw finger C, wherein the clamping jaw supporting frame is installed on the bottom plate; the short stroke biaxial cylinder is installed on the clamping jaw supporting frame; an output end is connected with the pneumatic clamping jaw A; the clamping jaw finger A is connected with an output end of the pneumatic clamping jaw A; the long stroke biaxial cylinder is installed on the bottom plate, and positioned below the short stroke biaxial cylinder; the output end of the long stroke biaxial cylinder is connected with the pneumatic clamping jaw B; the clamping jaw finger B is connected with the output end of the pneumatic clamping jaw B; the pneumatic clamping jaw C is installed on the clamping jaw supporting frame and positioned between the pneumatic clamping jaw A and the pneumatic clamping jaw B; the clamping jaw finger C is connected with the output end of the pneumatic clamping jaw C; the clamping jaw finger A and the pneumatic clamping jaw A are driven by the short stroke biaxial cylinder to move back and forth on the clamping jaw supporting frame; the clamping jaw finger B and the pneumatic clamping jaw B are driven by the long stroke biaxial cylinder to move back and forth on the bottom plate; the clamping jaw finger A and the clamping jaw finger C clamp a female quick joint; the clamping jaw finger B clamps a male quick joint; and the docking of the male quick joint and the female quick joint is realized through the driving of the long stroke biaxial cylinder and the short stroke biaxial cylinder.

Entirely rhombic openings for clamping a prism are formed on both sides of a clamping end of the clamping jaw finger A.

Each side of a clamping end of the clamping jaw finger C is a semicircular opening; and entirely circular openings for clamping the cylinder are formed on both sides of the clamping end.

The clamping jaw finger A and the pneumatic clamping jaw A, and the clamping jaw finger B and the pneumatic clamping jaw B are respectively positioned on both sides of the clamping jaw finger C and the pneumatic clamping jaw C.

The pneumatic clamping jaw A is connected with the output end of the short stroke biaxial cylinder through a clamping jaw fixing plate A; one end of the clamping jaw fixing plate A is connected with the pneumatic clamping jaw A, and the other end is connected with the output end of the short stroke biaxial cylinder; the pneumatic clamping jaw B is connected with the output end of the long stroke biaxial cylinder through a clamping jaw fixing plate B; one end of the clamping jaw fixing plate B is connected with the pneumatic clamping jaw B, and the other end is connected with the output end of the long stroke biaxial cylinder; the clamping jaw fixing plate A has the same shape and structure as those of the clamping jaw fixing plate B; and the shape is a cuboid structure and an oval hole for reducing self-weight and increasing a ratio of bearing capacity to weight is formed in the middle.

The projection of the biaxial centerline of the short stroke biaxial cylinder in the axial direction and the projection of the biaxial centerline of the long stroke biaxial cylinder in the axial direction on the bottom plate are respectively collinear.

Both sides in the lengthwise direction of the clamping jaw supporting frame are fixedly connected to the bottom plate; the short stroke biaxial cylinder is fixedly connected to an upper surface of the rear end of the clamping jaw supporting frame; the front end of the clamping jaw supporting frame extends upwards to form an installing plate; and the pneumatic clamping jaw C is fixedly connected to one side of the installing plate which faces the pneumatic clamping jaw B.

A weight reducing slot hole and a guide slot for guiding the motion of the pneumatic clamping jaw B are respectively formed in the bottom plate.

The present invention has the advantages and positive effects that:

1. The present invention adopts the humanoid configuration design, and has novel and unique structure.
2. The clamping jaw fingers of the present invention are designed as semicircle and rhombus, and have strong specificity and stable and reliable clamping.
3. The middle clamping jaw of the present invention is fixed, which reduces one degree of freedom and realizes easy control and high docking accuracy.
4. The structures of the clamping jaw supporting frame and the bottom plate of the present invention are locally hollowed out, so that the weight is light and the structures are compact.
5. The present invention has five degrees of freedom and can realize clamping and automatic docking of the quick joints.

Wherein: 1 clamping jaw finger A; 2 pneumatic clamping jaw A; 3 clamping jaw fixing plate A; 4 short stroke biaxial cylinder; 5 clamping jaw supporting frame; 6 bottom plate; 7 long stroke biaxial cylinder; 8 clamping jaw fixing plate B; 9 pneumatic clamping jaw B; 10 pneumatic clamping jaw C; 11 clamping jaw finger B; 12 clamping jaw finger C; 13 male quick joint; 14 female quick joint; 15 oval hole; 16 weight reducing slot hole; 17 guide slot; and 18 installing plate.

DETAILED DESCRIPTION

The present invention is further detailed below in combination with the drawings.

As shown in FIG. 1 to FIG. 4, the present invention comprises a clamping jaw finger A1, a pneumatic clamping jaw A2, a clamping jaw fixing plate A3, a short stroke biaxial cylinder 4, a clamping jaw supporting frame 5, a bottom plate 6, a long stroke biaxial cylinder 7, a clamping jaw fixing plate B8, a pneumatic clamping jaw B9, a pneumatic clamping jaw C10, a clamping jaw finger B11 and a clamping jaw finger B12, wherein the clamping jaw supporting frame 5 is installed on the bottom plate 6; the short stroke biaxial cylinder 4 is installed on the clamping jaw supporting frame 5; the pneumatic clamping jaw A2 is connected with an output end of the short stroke biaxial cylinder 4 through the clamping jaw fixing plate A3; one end of the clamping jaw fixing plate A3 is connected with the pneumatic clamping jaw A2 through a bolt, and the other end is connected with the output end of the short stroke biaxial cylinder 4 through the bolt; and the clamping jaw finger A1 is connected with the output end of the pneumatic clamping jaw A2. The long stroke biaxial cylinder 7 is installed on the bottom plate 6, and positioned below the short stroke biaxial cylinder 4; the pneumatic clamping jaw B9 is connected with the output end of the long stroke biaxial cylinder 7 through the clamping jaw fixing plate B8; one end of the clamping jaw fixing plate B7 is connected with the pneumatic clamping jaw B9 through the bolt, and the other end is connected with the output end of the long stroke biaxial cylinder 7 through the bolt; and the clamping jaw finger B11 is connected with the output end of the pneumatic clamping jaw B9. The pneumatic clamping jaw C10 is installed on the clamping jaw supporting frame 5 and positioned between the pneumatic clamping jaw A2 and the pneumatic clamping jaw B9; and the clamping jaw finger C12 is connected with the output end of the pneumatic clamping jaw C10. Entirely rhombic openings for clamping a prism target are designed on both sides of a clamping end of the clamping jaw finger A1. Each side of a clamping end of the clamping jaw finger C12 is designed as a semicircular opening; and entirely circular openings for clamping the cylinder structure are formed on both sides of the clamping end. The clamping jaw finger A1 and the clamping jaw finger C12 have strong specificity and stable and reliable clamping. The clamping jaw finger A1 and the pneumatic clamping jaw A2, and the clamping jaw finger B11 and the pneumatic clamping jaw B8 are respectively positioned on both sides of the clamping jaw finger C12 and the pneumatic clamping jaw C10. The clamping jaw finger A1 and the pneumatic clamping jaw A2 are driven by the short stroke biaxial cylinder 4 to move back and forth on the clamping jaw supporting frame 5; and the clamping jaw finger B11 and the pneumatic clamping jaw B9 are driven by the long stroke biaxial cylinder 7 to move back and forth on the bottom plate 6.

Figure 1:
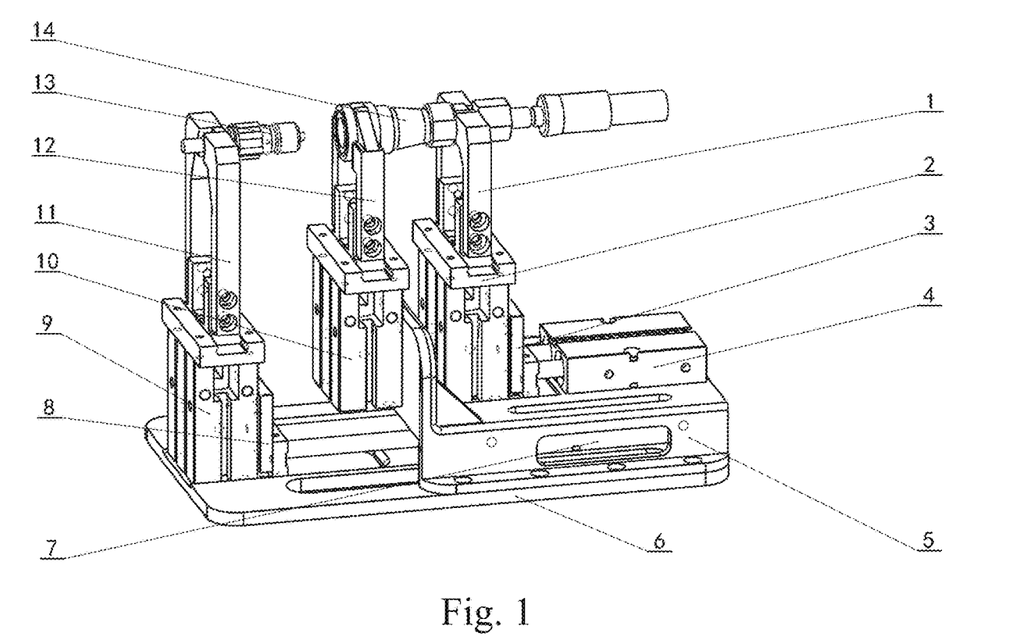
FIG. 1 is an overall structural schematic diagram of the present invention.
Figure 2:
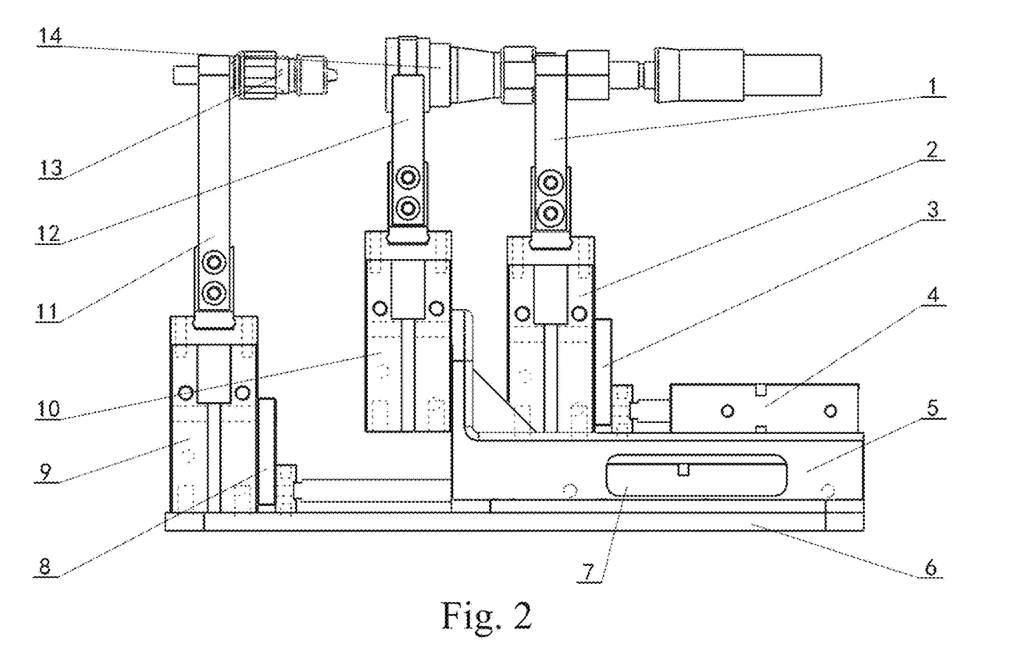
FIG. 2 is a structural front view of the present invention.
Figure 3:
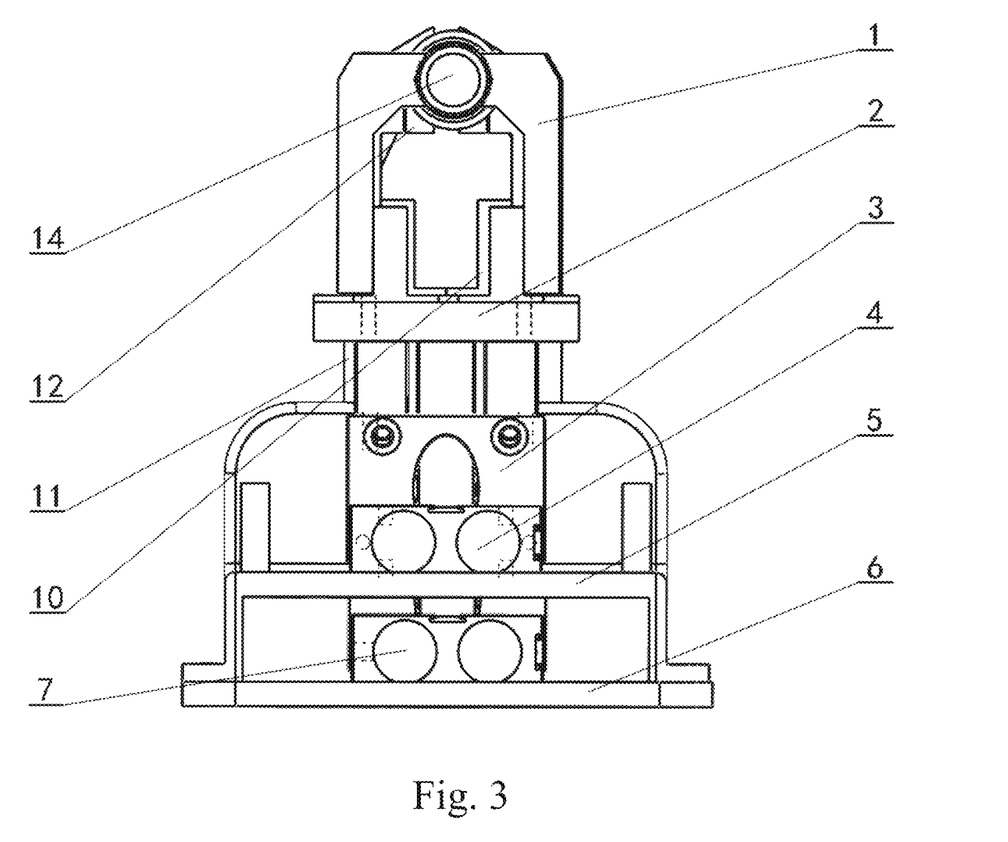
FIG. 3 is a structural right view of the present invention.
Figure 4:
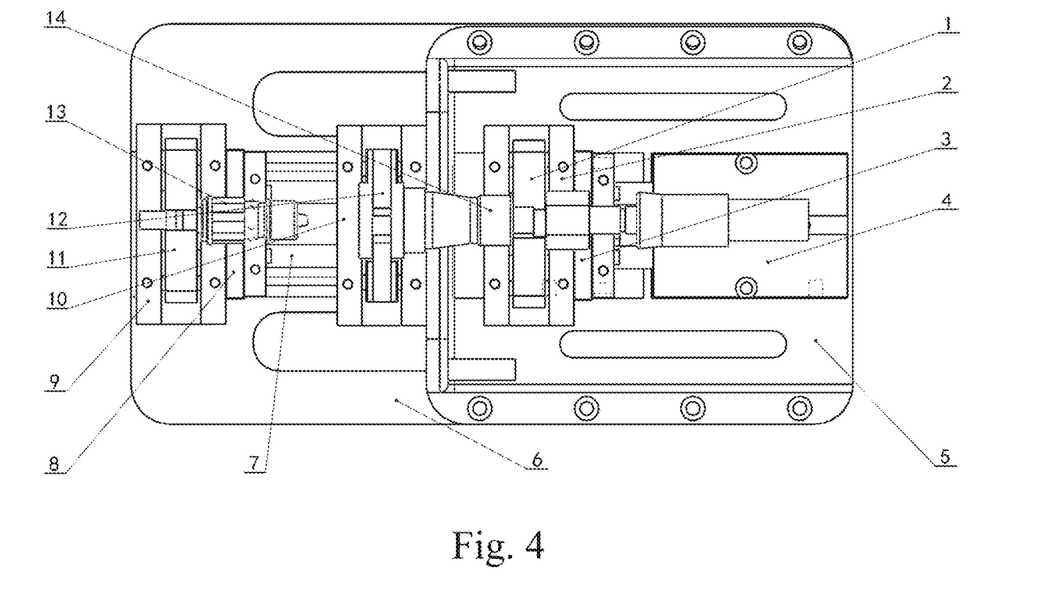
FIG. 4 is a structural top view of the present invention.
Figure 5:
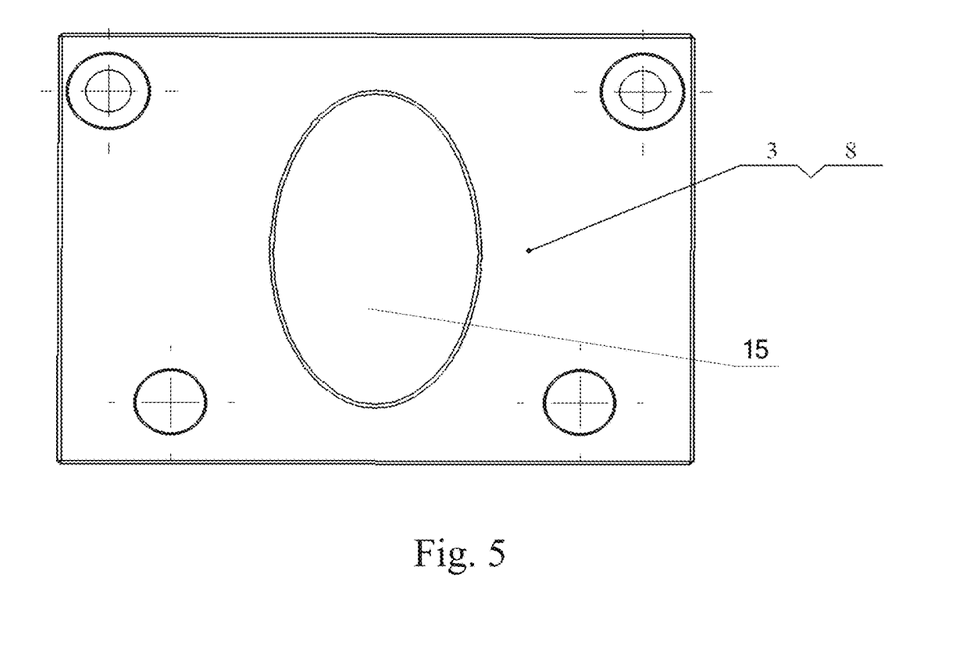
FIG. 5 is a structural schematic diagram of a clamping jaw fixing plate of the present invention.

As shown in FIG. 5, the clamping jaw fixing plate A3 has the same shape and structure as those of the clamping jaw fixing plate B8; and the shape is a cuboid structure and an oval hole 15 for reducing self-weight and increasing a ratio of bearing capacity to weight is formed in the middle.

Figure 6:
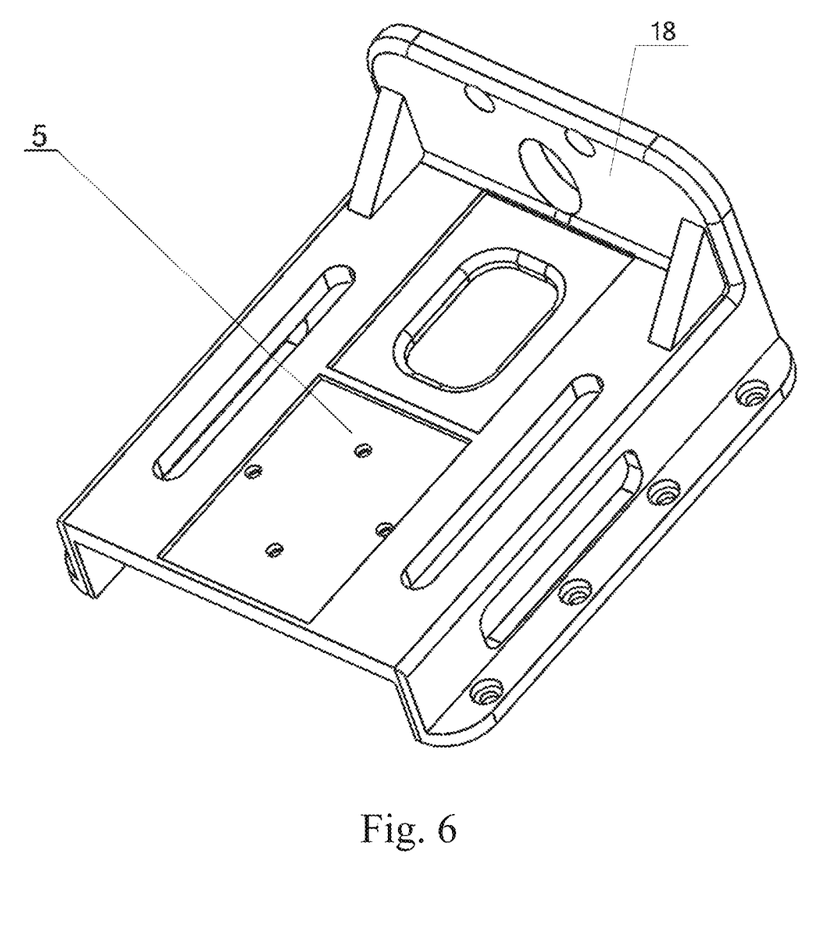
FIG. 6 is a structural schematic diagram of a clamping jaw supporting frame of the present invention.

As shown in FIG. 6, both sides in the lengthwise direction of the clamping jaw supporting frame 5 are fixedly connected to the bottom plate 6; the short stroke biaxial cylinder 4 is fixedly connected to an upper surface of the rear end of the clamping jaw supporting frame 5; the front end of the clamping jaw supporting frame 5 extends upwards to form an installing plate 18; and the pneumatic clamping jaw C10 is fixedly connected to one side of the installing plate 18 which faces the pneumatic clamping jaw B9. Holes and slots with different sizes and shapes are respectively formed on the upper surface and the side surface of the clamping jaw supporting frame 5 for reducing self-weight and arrangement of air pipe lines.

Figure 7:
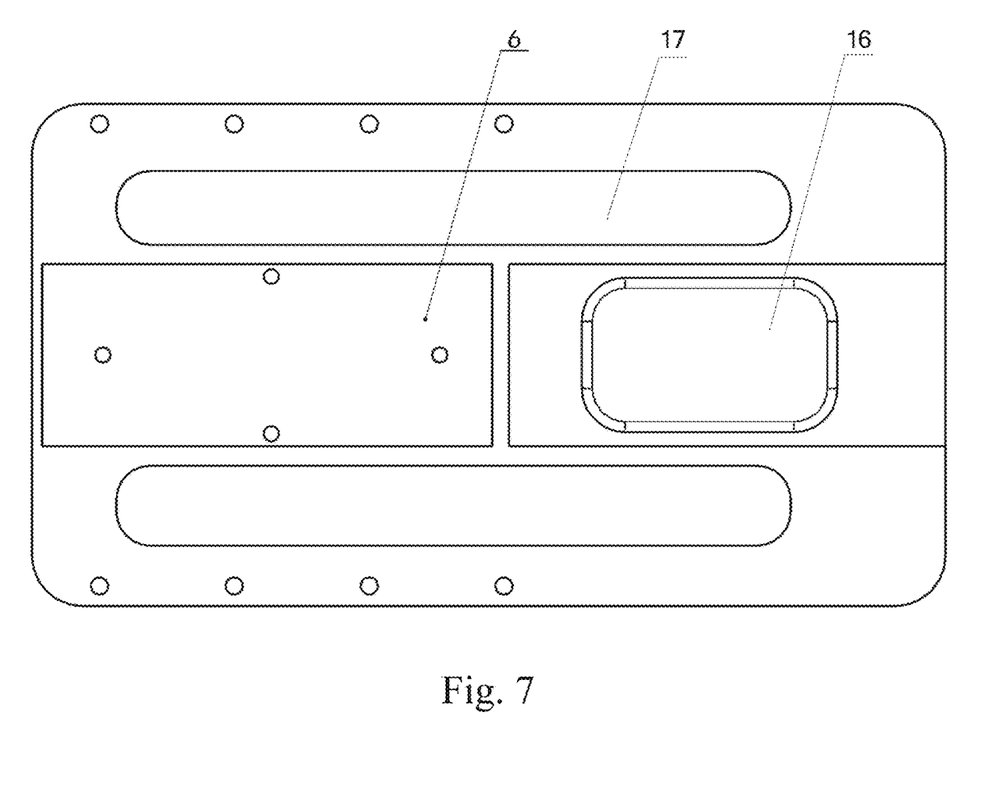
FIG. 7 is a structural schematic diagram of a bottom plate of the present invention.

As shown in FIG. 7, a weight reducing slot hole 16 and a guide slot 17 for guiding the motion of the pneumatic clamping jaw B9 are respectively formed in the bottom plate 6. The bottom plate 6 has light weight and compact structure and is used for fixedly supporting the long stroke biaxial cylinder 7 and the clamping jaw supporting frame 5.

The projection of the biaxial centerline of the short stroke biaxial cylinder 4 in the axial direction and the projection of the biaxial centerline of the long stroke biaxial cylinder 7 in the axial direction on the bottom plate 6 are respectively collinear.

The present invention has the operating principle that:

The present invention has five degrees of freedom, i.e., the clamping of the clamping jaw finger A1, the clamping jaw finger B11 and the clamping jaw finger C12, the motion of the pneumatic clamping jaw A2 and the clamping jaw finger A1 under the drive of the short stroke biaxial cylinder 4, and the motion of the pneumatic clamping jaw B9 and the clamping jaw finger B11 under the drive of the long stroke biaxial cylinder 7.

Figure 8:
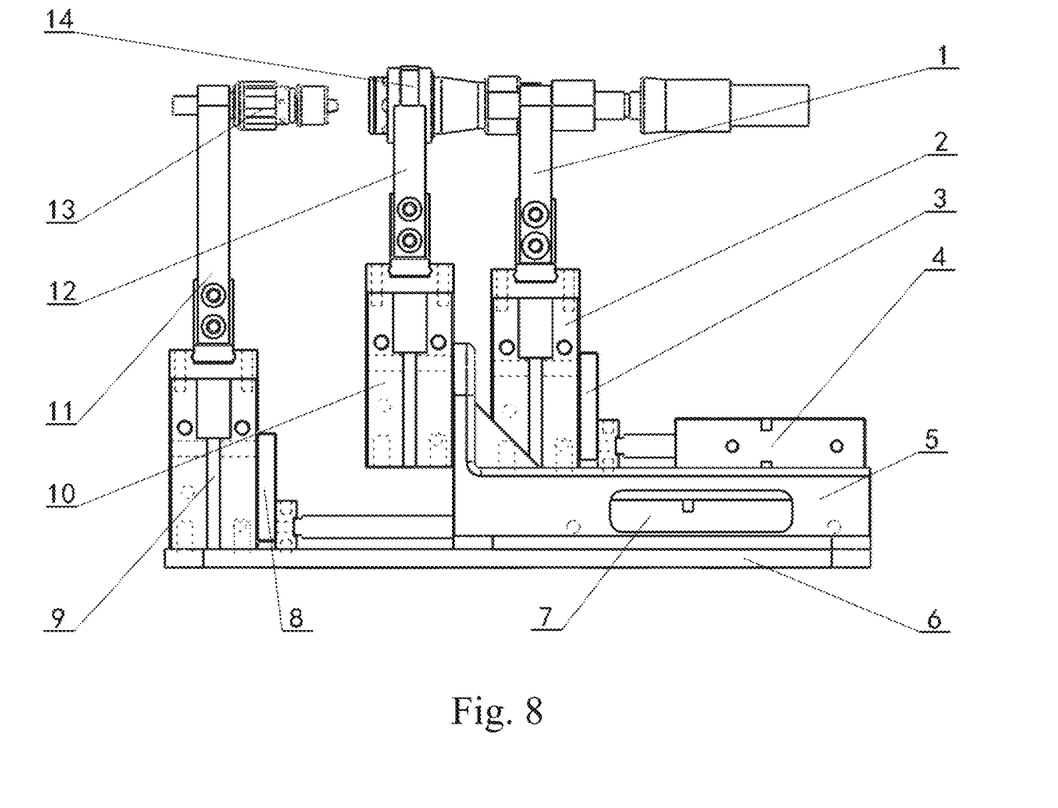
FIG. 8 is a schematic diagram I of an automatic docking process of the present invention.
Figure 9:
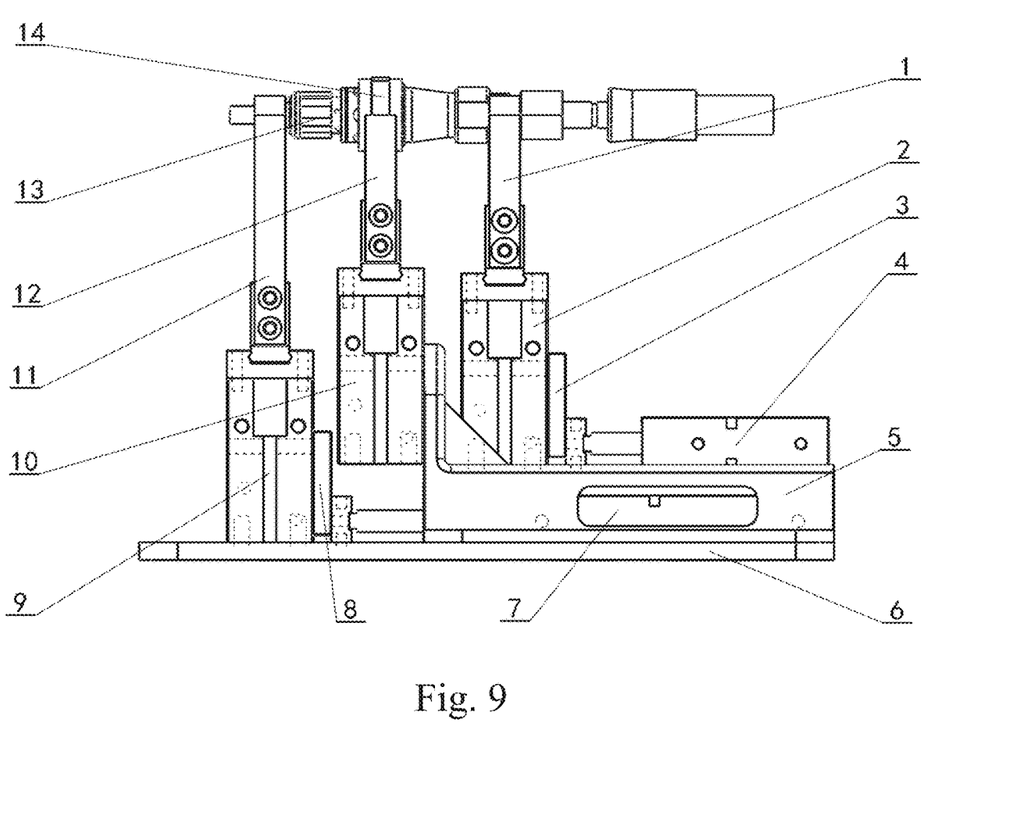
FIG. 9 is a schematic diagram II of an automatic docking process of the present invention.

The clamping jaw finger A1 and the clamping jaw finger C12 simultaneously clamp a spring return type female quick joint 14, and the clamping jaw finger B11 clamps a spring return type male quick joint 13. The short stroke biaxial cylinder 4 is operated; and the clamping jaw fixing plate A3 pushes the pneumatic clamping jaw A2 to extend and reach a set distance so that the spring return type female quick joint 14 is unlocked, as shown in FIG. 8. Then, the long stroke biaxial cylinder 7 is operated; and the clamping jaw fixing plate B8 pulls the pneumatic clamping jaw B9 so that the spring return type male quick joint 13 is steadily inserted into the spring return type female quick joint 14, as shown in FIG. 9. Finally, the short stroke biaxial cylinder 4 is pulled back to reach an initial position, and the pneumatic clamping jaw A2, the pneumatic clamping jaw B9 and the pneumatic clamping jaw C10 respectively drive to release the clamping jaw finger A1, the clamping jaw finger B11 and the clamping jaw finger C12 to complete the automatic docking of the spring return type quick joints.

The present invention drives the retractable and pneumatic clamping jaws of the long stroke biaxial cylinder and the short stroke biaxial cylinder to open and close through air pressure, to realize the automatic docking of the spring return type quick joints. The present invention adopts the humanoid configuration design, can realize the automatic docking of the spring return type quick joints, and has unique appearance, novel structure, simple control and strong working reliability.

The invention claimed is:

1. A robotic clamper, comprising:
a first clamping jaw finger, a first pneumatic clamping jaw, a short stroke biaxial cylinder, a clamping jaw supporting frame, a bottom plate, a long stroke biaxial cylinder, a second pneumatic clamping jaw, a third pneumatic clamping jaw, a second clamping jaw finger, and a third clamping jaw finger,
wherein:
the clamping jaw supporting frame is installed on the bottom plate;
the short stroke biaxial cylinder is installed on the clamping jaw supporting frame;
an output end of the short stroke biaxial cylinder is connected with the first pneumatic clamping jaw;
the first clamping jaw finger is connected with an output end of the first pneumatic clamping jaw;
the long stroke biaxial cylinder is installed on the bottom plate and positioned below the short stroke biaxial cylinder;
an output end of the long stroke biaxial cylinder is connected with the second pneumatic clamping jaw;
the second clamping jaw finger is connected with an output end of the second pneumatic clamping jaw;
the third pneumatic clamping jaw is installed on the clamping jaw supporting frame and positioned between the first pneumatic clamping jaw and the second pneumatic clamping jaw;
the third clamping jaw finger is connected with an output end of the third pneumatic clamping jaw;
the first clamping jaw finger and the first pneumatic clamping jaw are configured to be driven by the short stroke biaxial cylinder to move back and forth on the clamping jaw supporting frame; and
the second clamping jaw finger and the second pneumatic clamping jaw are configured to be driven by the long stroke biaxial cylinder to move back and forth on the bottom plate.

2. The robotic clamper according to claim 1, wherein a rhombic opening for clamping a prism is formed by closing both sides of a clamping end of the first clamping jaw finger.

3. The robotic clamper according to claim 1, wherein each side of a clamping end of the third clamping jaw finger is a semicircular opening.

4. The robotic clamper according to claim 1, wherein the first clamping jaw finger and the first pneumatic clamping jaw, and the second clamping jaw finger and the second pneumatic clamping jaw are respectively positioned on both sides of the third clamping jaw finger and the third pneumatic clamping jaw.

5. The robotic clamper according to claim 1, wherein the first pneumatic clamping jaw is connected with the output end of the short stroke biaxial cylinder through a first clamping jaw fixing plate; a first end of the first clamping jaw fixing plate is connected with the first pneumatic clamping jaw, and a second end of the first clamping jaw fixing plate is connected with the output end of the short stroke biaxial cylinder; the second pneumatic clamping jaw is connected with the output end of the long stroke biaxial cylinder through a second clamping jaw fixing plate; one end of the second clamping jaw fixing plate is connected with the second pneumatic clamping jaw, and the other end is connected with the output end of the long stroke biaxial cylinder.

6. The robotic clamper according to claim 5, wherein the first clamping jaw fixing plate and the second clamping jaw fixing plate are of B a cuboid structure having an oval hole.

7. The robotic clamper according to claim 1, wherein a projection of a biaxial centerline of the short stroke biaxial cylinder and a projection of a biaxial centerline of the long stroke biaxial cylinder on the bottom plate are collinear.

8. The robotic clamper according to claim 1, wherein both sides in a longitudinal direction of the clamping jaw supporting frame are fixedly connected to the bottom plate; the short stroke biaxial cylinder is fixedly connected to an upper surface of a rear end of the clamping jaw supporting frame; a front end of the clamping jaw supporting frame extends upwards to form an installing plate; and the third pneumatic clamping jaw is fixedly connected to one side of the installing plate facing the second pneumatic clamping jaw.

9. The robotic clamper according to claim 1, wherein a weight reducing slot hole and a guide slot for guiding a movement of the second pneumatic clamping jaw are formed in the bottom plate.

10. A method for connecting a male quick joint and a female quick joint using the robotic clamper according to claim 1, comprising:
clamping the female quick joint using the first clamping jaw finger and the third clamping jaw finger;
clamping a male quick joint using the second clamping jaw finger; and
driving the female quick joint using the short stroke biaxial cylinder and the male quick joint using the long stroke biaxial cylinder toward each other to form a connection.

* * * * *